Patented Aug. 9, 1938

2,126,074

UNITED STATES PATENT OFFICE 2,126,074

BRAZING

William A. Wissler, Niagara Falls, N. Y., assignor to Haynes Stellite Company, a corporation of Indiana No Drawing. Application December 28, 1935, Serial No. 56,540

7 Claims. (Cl. 113—112)

The invention relates to brazing, and particularly to brazing operations carried out by fusion in furnaces in the presence of a controlled atmosphere.

It is known that an atmosphere of hydrogen is especially advantageous for the brazing of most metals, as for example plain carbon steel, nickel and copper base alloys and the like. If, however, an atmosphere of commercial grades of hydrogen is used for the brazing of high chromium alloys such as stainless steel, rustless iron, "Stellite" or the like, the surface of the metal rapidly acquires a film or coating which either impedes or completely prevents brazing. Methods ordinarily employed for preparing hydrogen to be used in brazing, such as treatment with phosphorus pentoxide, are not effective in preventing the formation of such films.

I have found, however, that this film effect entirely disappears and that brazing readily takes place with high chromium alloys, if the hydrogen to be supplied to the brazing furnace is first prepared by bubbling it through, or passing it over, a bath of molten sodium or potassium, or a mixture thereof.

The effectiveness for brazing purposes of an atmosphere consisting of hydrogen so treated may be attributable to the absence of impurities in the hydrogen and/or to traces of sodium or potassium or both in the gas when it is supplied to the furnace during the brazing operation. Whatever the cause, the effectiveness of the treatment is very pronounced, and it provides means whereby the furnace brazing of high chromium alloys can be carried out cheaply and without difficulty in an atmosphere of hydrogen.

While the invention was developed especially for the purpose of overcoming difficulties in the brazing of high chromium alloys in a hydrogen atmosphere, it will be obvious that hydrogen prepared after the manner of the invention may advantageously be used in the brazing of other metals, particularly those containing readily oxidized or tarnished alloying elements. It will also be evident that other gases used in furnace brazing treatments, such as nitrogen or mixtures of hydrogen and nitrogen, may with benefit be treated after the manner of the invention.

The process of the invention is also useful for treating high-chromium alloys to reduce and remove surface films of oxide and the like, or for preventing the development of such films. For example, parts made of "Stellite", which contains about 30% chromium, can be freed from surface oxide and brazed by heating the same to about 1,000° C., in an atmosphere of hydrogen treated as described above. Accordingly, the invention includes processes for inhibiting or reducing surface oxidation on articles comprising an alloy containing a substantial amount of chromium.

I claim:

1. In a process for the furnace brazing of high-chromium metals in an atmosphere composed of neutral or reducing gas, the step which comprises preparing the gas for use by passing it in contact with a bath of molten alkali metal of the group consisting of sodium and potassium.

2. In a process for the furnace brazing of high-chromium metals in a hydrogen atmosphere, the step which comprises preparing the hydrogen for use by passing it in contact with a bath of molten sodium.

3. A process of brazing high chromium alloys which comprises conducting the brazing operation in a furnace chamber heated to a brazing temperature and containing an atmosphere of hydrogen which has been contacted with a bath of molten alkali metal of the group consisting of sodium and potassium.

4. A process for the furnace brazing of high chromium alloys, which comprises carrying out the brazing operation in an atmosphere of hydrogen which has been prepared by bubbling it through a bath of molten sodium.

5. Process of inhibiting or reducing surface oxidation on an article consisting of an alloy containing a substantial amount of chromium, which process comprises heating said article to a high temperature in an atmosphere of hydrogen which has been contacted with a molten body of alkali metal of the group consisting of sodium and potassium.

6. Process of inhibiting or reducing surface oxidation on an article consisting of an alloy containing a substantial amount of chromium, which process comprises heating said article to about 1,000° C. in an atmosphere of hydrogen which has been passed through a body of molten metal of the group consisting of sodium and potassium.

7. Process of inhibiting or reducing surface oxidation on an article consisting of an alloy containing a substantial amount of chromium, which process comprises heating said article to a high temperature in an atmosphere of hydrogen which has been contacted with a bath of molten alkali metal of the group consisting of sodium and potassium.

WILLIAM A. WISSLER.